(12) United States Patent
Dindl

(10) Patent No.: US 6,904,838 B1
(45) Date of Patent: Jun. 14, 2005

(54) BALLISTICALLY DEPLOYED RESTRAINING NET

(75) Inventor: Frank J. Dindl, Newton, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 7 days.

(21) Appl. No.: 10/708,878

(22) Filed: Mar. 30, 2004

(51) Int. Cl.[7] ................................................ B64D 1/04
(52) U.S. Cl. ......................... 89/1.1; 89/1.11; 42/106; 102/502; 102/400
(58) Field of Search .................... 89/1.1, 1.11; 42/106; 102/502, 400; 114/241

(56) References Cited

U.S. PATENT DOCUMENTS

| | | | | |
|---|---|---|---|---|
| 4,912,869 A | * | 4/1990 | Govett | 42/105 |
| 5,069,109 A | * | 12/1991 | Lavan, Jr. | 89/1.11 |
| 5,583,311 A | * | 12/1996 | Rieger | 89/1.11 |
| 5,750,918 A | * | 5/1998 | Mangolds et al. | 102/502 |
| 5,988,036 A | * | 11/1999 | Mangolds et al. | 88/1.1 |
| 6,626,077 B1 | * | 9/2003 | Gilbert | 89/1.11 |

* cited by examiner

Primary Examiner—J. Woodrow Eldred
(74) Attorney, Agent, or Firm—Michael C. Sachs; John F. Moran

(57) ABSTRACT

A restraining net launching device includes a planar restraining net which is tightly packed into a cylindrical shape having an outside portion. This restraining net, when planar or unfurled, includes a perimeter which is heavier than a remainder of the net. A launcher is provided in which the packed net is loaded, and from which the packed net is launched toward a target when desired. The launcher includes rifling which engages the outside portion of the packed net during launching. A source of propelling gas is used for propelling the tightly packed restraining net out of the launcher during launching. When the launching device is fired, the rifling of the launcher engages the outside portion of the packed restraining net to cause the tightly packed restraining net to rotate about the longitudinal axis and hence to unfurl after exiting the launcher with the heavier perimeter radially outermost.

9 Claims, 2 Drawing Sheets

BALLISTICALLY DEPLOYED RESTRAINING NET

FEDERAL RESEARCH STATEMENT

The inventions described herein may be manufactured, used and licensed by or for the U.S. Government for U.S. Government purposes.

BACKGROUND OF INVENTION

Law enforcement and military personnel have applications requiring the restraining of individuals and animals. A variety of devices have been developed over the years to ballistically deliver restraining nets. The key difference being the method used for unfurling and deploying the net in flight. For example, the net gun disclosed in U.S. Pat. No. 4,912,869 uses a plurality of barrels to launch projectiles with diverging flight paths to drag the net package to the target and deploy the net in flight. In the ballistically deployed restraining system disclosed in U.S. Pat. No. 5,988,036, a spreader charge and weights is used to spread the net in flight.

SUMMARY OF INVENTION

In accordance with the present invention, a restraining net ballistic launching device is provided which includes a planar restraining net which is tightly packed into a cylindrical shape having an outside portion. This restraining net, when planar or unfurled, includes a perimeter which is heavier than a remainder of the net. A launcher is provided in which the packed net is loaded, and from which the packed net is launched when desired. The launcher includes rifling which engages the outside portion of the packed net during launching. Finally, there is provided a source of propelling gas for propelling the tightly packed restraining net out of the launcher during launching. Thus, when the launching device is fired, the rifling of the launcher engages the outside portion of the packed restraining net to cause the tightly packed restraining net to rotate about the longitudinal axis and hence to unfurl after exiting the launcher with the heavier perimeter radially outermost.

In one preferred embodiment, the launcher includes an elongate launch cup in which the packed net is located. This launch cup includes a rear wall, an open front, an elongate barrel wall extending between the rear wall and the open front, and rifling along an interior surface of the barrel wall. In addition, a hollow extension projects from the rear wall of the launch cup. Then, in this preferred embodiment, the source of propelling gas is a muzzle to which the extension of the launch cup is attached for transferring a propelling gas formed in the muzzle into an area adjacent the rear wall of the launch cup. Preferably, the launcher also includes a gas seal member in the launch cup located between the packed net and the rear wall of the launch cup.

In another preferred embodiment, the launcher includes a gun barrel having a rifled bore and a rear breech. Received in this breech is a cartridge case in which the packed net is located. This cartridge case includes a rear wall and an open front. Then, in this preferred embodiment, the source of propelling gas is a charge provided in the cartridge case between the packed net and the rear wall. Preferably, the launcher also includes a gas seal member located between the packed net and the charge, and the cartridge case also includes a protective cap which covers the open front thereof.

In a further preferred embodiment, the launcher includes a gun barrel having a smooth bore and a rear breech. Received in this breech is a cartridge case in which the packed net is located. This cartridge case includes a rear wall, an open front, and rifling along an interior wall of the cartridge case between the rear wall and the open front. Then, in this preferred embodiment, the source of propelling gas is a charge provided in the cartridge case between the packed net and the rear wall. Preferably, the launcher also includes a gas seal member located between the packed net and the charge, and the cartridge case also includes a protective cap which covers the open front thereof.

It is an advantage of the present invention that a ballistically deployed restraining net is provided which is launched in a manner similar to other specialty projectiles.

It is also an advantage of the present invention that centrifugal forces created by rifling which engages the packed restraining net are used to cause the ballistically fired restraining net to unfurl in flight to a target.

It is a further advantage of the present invention that the spinning of the restraining net to unfurl it in flight provides a simple and economical mechanism to ballistically deploy a restraining net.

Other features and advantages of the present invention are stated in or apparent from detailed descriptions of presently preferred embodiments of the invention found hereinbelow.

DETAILED DESCRIPTION

Figure 5:
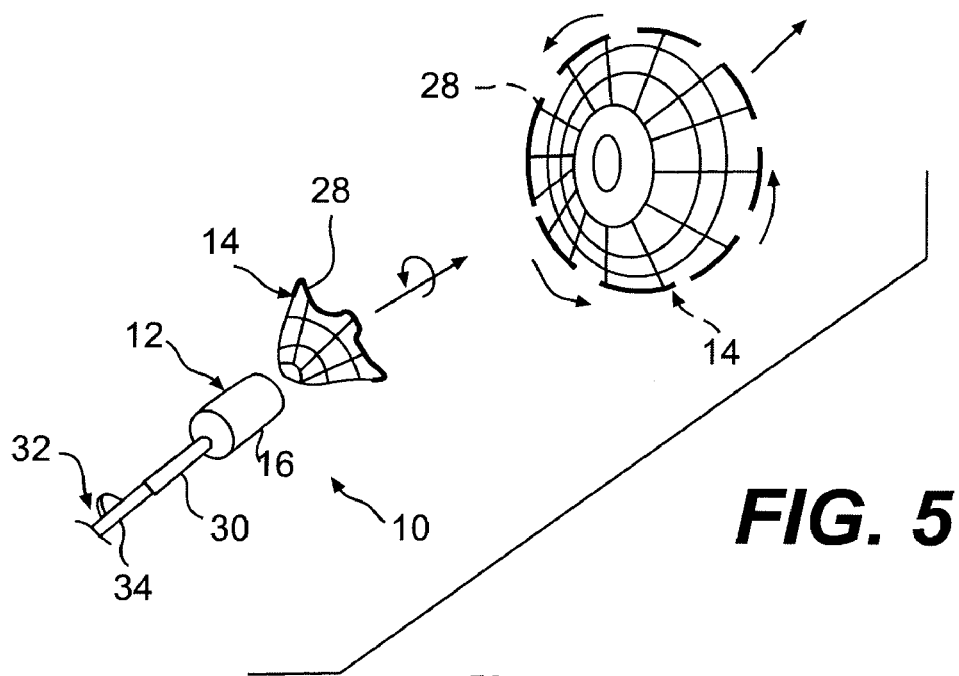
FIG. 5 is a perspective rear, top and side view of the restraining net launching device using the restraining net launcher of FIG. 1 further after exiting of the restraining net from the launcher, and the restraining net is also shown in broken lines as the restraining net unfurls during flight to the target.

With reference now to the drawings in which like numerals represent like elements throughout the views, a first embodiment of a restraining net launching device 10 is schematically depicted in FIG. 5. Launching device includes a launcher 12 from which a planar restraining net 14 has just been deployed, with restraining net also shown unfurled in broken lines in FIG. 5 as net 14 flies towards a target. As shown in FIGS. 1–4, which show various stages of the firing of launcher 12 as discussed below, restraining net 14 is initially tightly packed into a cylindrical shape and loaded into a launch cup 16 of launcher 12. Launch cup 16 includes a rear wall 18, an open front 20, an elongate barrel wall 22 extending between rear wall 18 and open front 20, and rifling 24 along an interior surface 26 of barrel wall 22 with which an outer portion 29 of packed net 14 is engaged or pressed against.

It will be appreciated that, when restraining net 14 is unfurled as depicted in broken lines in FIG. 5, restraining net 14 includes a perimeter 28 which is heavier than a remainder of restraining net 14. In the embodiment depicted in FIG. 5, heavier perimeter 28 is provided by making the lines comprising perimeter 28 of a heavier gauge or diameter than lines of the remainder of restraining net 14. This is satisfactory for a net which is made of connected lines as typical. However, is the net were made of some other material where this was not convenient or desired, perimeter 28 could be made heavier by the addition of weights, a separate border, or the like. Where weights are used, such weights should be made of a somewhat soft material so that impact of the weights with a target will not damage the target, such as rubber. It will also be appreciated that various materials can be used to make up net 14, such as nylon or KEVLAR, so that with higher strength materials a smaller resulting packed net and hence launch cup 16 would be required.

Launch cup 16 also includes a hollow extension 30 projecting from rear wall 18. Extension 30 is designed to connect to a source 32 of a propelling gas to transfer the gas into launch cup 16. In this embodiment, the source 32 is a muzzle 34 of a gun as known in the art which is designed to ignite a propelling gas charge which travels up muzzle 34 and into extension 30. An adapter mechanism as also known in the art is used to attach extension 30 to muzzle 34, so that other devices besides launcher 10 requiring a ballistic charge can also be used with muzzle 34 as desired.

As shown in FIGS. 1–4, located between rear wall 18 of launch cup 16 and packed net 14 is a gas seal member 36. Seal member 36 includes a peripheral flange 38 extending rearwardly from a main body 40 to ensure a good gas tight seal behind seal member 36 when the propelling gas is introduced into launch cup 16.

Figure 1:
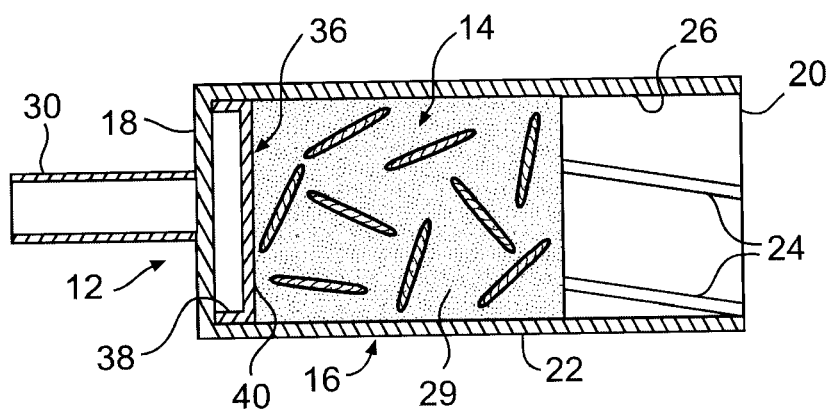
FIG. 1 is a cross-sectional side view of a restraining net launcher prior to firing in accordance with the present invention.
Figure 2:
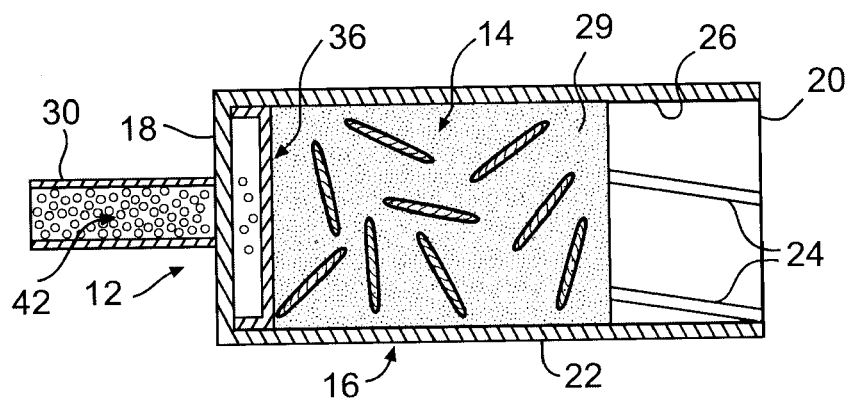
FIG. 2 is a cross-sectional side view of the restraining net launcher of FIG. 1 after initiation of firing.
Figure 3:
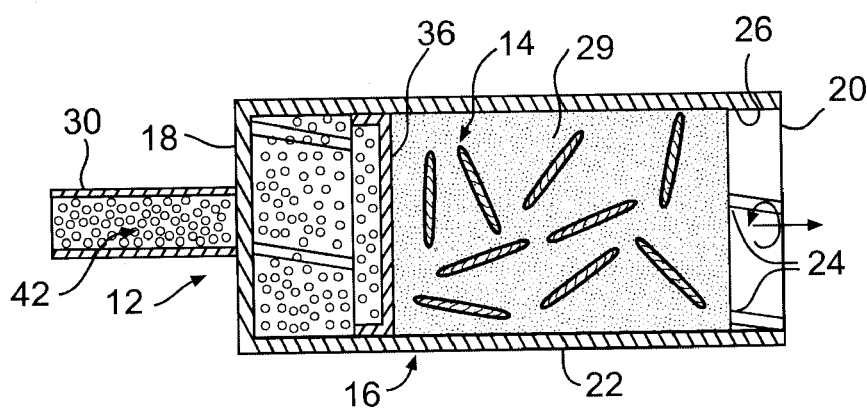
FIG. 3 is a cross-sectional side view of the restraining net launcher of FIG. 1 after firing as the restraining net moves along the launcher.
Figure 4:
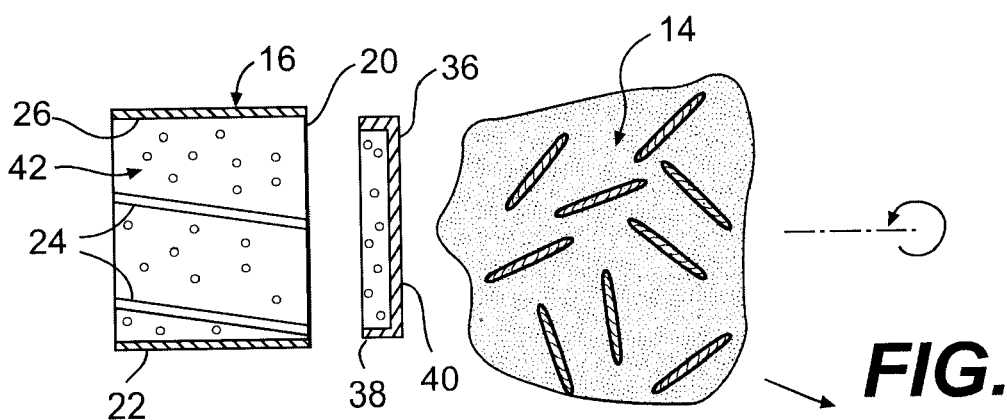
FIG. 4 is a cross-sectional side view of the restraining net launcher of FIG. 1 just after exiting of the restraining net from the launcher.

In operation, launching device 10 functions in the following manner. It will be appreciated that launching device 10 is typically carried separate from muzzle 34 and is only attached thereto when firing of net 14 is desired, or at least in anticipation of the firing of net 14. Thus, for convenience, launching device 10 is shown in FIG. 1 in position on muzzle 34 ready for firing. In FIG. 2, source of gas 32 has just been ignited and a hot/expanding gas 42 is just entering into the volume behind gas seal member 36. Due to the pressure of hot gas 42, gas seal member 36 and packed net 14 are pushed along launch cup 16, with the outer portions of flange 38 and packed net 14 engaging rifling 24 along interior surface 26 of launch cup 16. Engagement of rifling 24 causes packed net 14 and seal member 36 to spin in the direction noted by the arrow in FIG. 3. Upon exiting launch cup 16, seal member 36 separates from packed net 14 and packed net 14 begins to expand due to centrifugal force from the packed state. As net 14 flies forward and spins, heavier perimeter 28 causes net 14 to unfurl into its full expanded form as shown by the dashed lines in FIG. 5 so that net 14 is in position to impact and immobilize a target (not shown). On the other hand, gas seal member 36 loses stability after exiting open front 20 and soon drops harmlessly to the ground.

Figure 6:
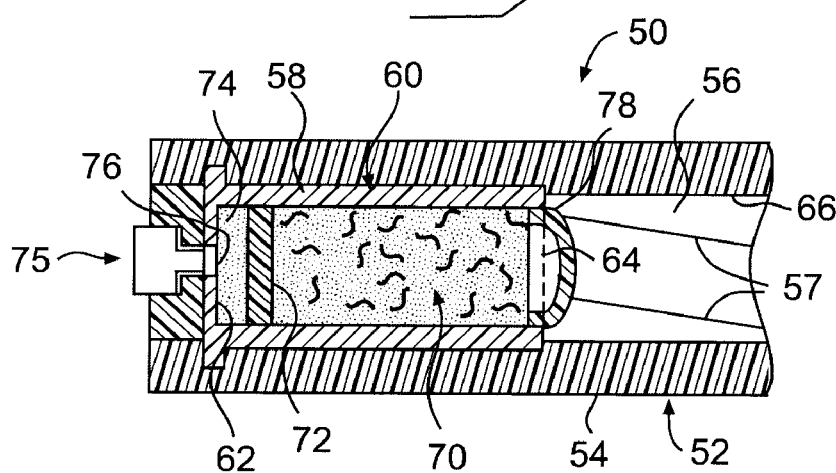
FIG. 6 is a cross-sectional side view of a second embodiment of a restraining net launching device prior to firing in accordance with the present invention.

Depicted in FIG. 6 is a second embodiment of a launching device 50 in accordance with the present invention. In this embodiment, launching device 50 includes a launcher 52 which is formed by a gun barrel 54 having a bore 56 with rifling 57 therealong and a rear breech 58. Conveniently, launcher 52 is a conventional launcher used for a variety of ballistically propelled devices as known in the art and typically launcher 52 is provided adjacent a common rifle barrel, but launcher 52 could also be a dedicated launcher as known in the art as well. Located in breech 58 of launcher 52 is a self-contained cartridge case 60. Cartridge case 60 includes a rear wall 62, an open front 64, and an interior wall 66 extending between rear wall 62 and open front 64. A packed net 70 similar to packed net 14 as described above is located inside of cartridge case 60.

Located rearward of packed net 70 is a gas seal member 72 which in this embodiment is a flat disk. Behind gas seal member 72 is a charge 74 of a suitable propellant powder, which is ignited in the conventional manner by firing pin mechanism 75 engaging a primer 76 located in rear wall 62. Preferably, to protect packed net 70 and to make cartridge case 60 self-sealed, a protective cap 78 made of plastic or the like is provided to cover and seal open front 64.

In operation, launching device 50 functions in substantially the same manner as launching device 10 described above. In particular, after firing of launcher 52, rifling 57 engages an outer portion of packed net 70 as packed net 70 exits cartridge case 60. This causes packed net 70 to have a rotation as it exits gun barrel 54 and flies towards the target, and hence for packed net 70 to unfurl during flight due to centrifugal forces in the same manner as packed net 14 described above. It will be appreciated that protective cap 78 is pushed out of gun barrel 54 ahead of packed net 70 and flies harmlessly out of the way or breaks up due to its shape or composition, and likewise gas seal member 72 also loses stability and soon drops harmlessly to the ground.

Figure 7:
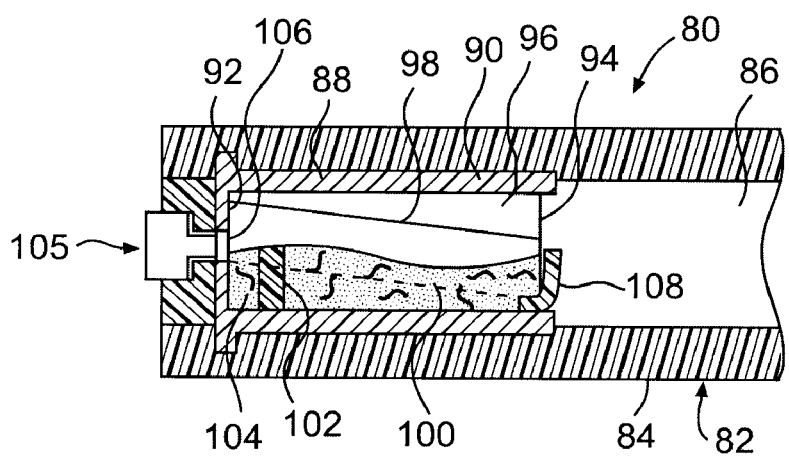
FIG. 7 is a cross-sectional side view of a third embodiment of a restraining net launching device prior to firing in accordance with the present invention and further with a longitudinal portion of the interior elements of the cartridge case shown cut away.

Depicted in FIG. 7 is a third embodiment of a launching device 80 in accordance with the present invention. In this embodiment, launching device 80 includes a launcher 82 which is formed by a gun barrel 84 having a smooth bore 86 and a rear breech 88. Conveniently, launcher 82 is another conventional launcher used for a variety of self-propelled devices as known in the art and typically provided adjacent a common rifle barrel, but launcher 82 could be a dedicated launcher as well. Located in breech 88 is a self-contained cartridge case 90. Cartridge case 90 includes a rear wall 92, an open front 94, and an interior wall 96 extending between rear wall 92 and open front 94. It will be appreciated that one half of the elements inside of cartridge case 90 have been longitudinally cut away to better show interior wall 96, and in particular that located along interior wall 96 from rear wall 92 (or at least adjacent thereto) to open front 94 is a rifling 98. A packed net 100 similar to packed net 14 or packed net 70 as described above is located inside of cartridge case with the outside portion thereof in engagement with rifling 98.

Located rearward of packed net 100 is a gas seal member 102 which in this embodiment is also a flat disk. Behind gas seal member 102 is a charge 104 of a suitable propellant powder, which is ignited in the conventional manner by firing pin mechanism 105 engaging a primer 106 located in rear wall 92. Preferably, to protect packed net 100 and to make cartridge case 90 self-sealed, a protective cap 108 made of plastic or the like is provided to cover and seal open front 94.

In operation, launching device 80 functions in substantially the same manner as launching devices 10 and 50 described above. In particular, at firing of launcher 82 (and of course prior thereto), rifling 98 engages an outer portion of packed net 100 as packed net 70 begins to move along and to exit cartridge case 90. This causes packed net 100 to have a rotation as it exits open front 94, which rotation is maintained as it moves along gun barrel 84 and flies towards the target. Hence, packed net 100 unfurls during flight in the same manner as packed nets 14 and 70 described above. It will be appreciated that, like protective cap 78, protective cap 108 is pushed out of gun barrel 84 ahead of packed net 100 and flies harmlessly out of the way or breaks up due to its shape or composition, and likewise gas seal member 102 also loses stability and soon drops harmlessly to the ground.

While the present invention has been described with respect to exemplary embodiments thereof, it will be understood by those of ordinary skill in the art that other variations and modifications can be effected within the scope and spirit of the invention.

What is claimed is:

1. A restraining net launching device comprising:
   a planar restraining net which is tightly packed into a cylindrical shape having an outside portion, said restraining net when planar including a perimeter which is heavier than a remainder of said net;
   a launcher in which said packed net is loaded and from which said packed net is launched along a longitudinal axis of said launcher, said launcher including rifling which engages the outside portion of said packed net during launching; and
   a source of propelling gas for propelling said tightly packed restraining net out of said launcher during launching such that the rifling of said launcher engaging the outside portion causes said tightly packed restraining net to rotate about the longitudinal axis and unfurl after exiting said launcher with the heavier perimeter radially outermost.

2. A restraining net launching device as claimed in claim 1:
   wherein said launcher includes
   a) an elongate launch cup in which said packed net is located, said launch cup including a rear wall, an open front, an elongate barrel wall extending between said rear wall and said open front, and rifling along an interior surface of said barrel wall, and
   b) a hollow extension projecting from the rear wall of said launch cup; and
   wherein said source of propelling gas is a muzzle to which said extension of said launch cup is attached for transferring propelling gas formed in said muzzle into an area adjacent the rear wall of said launch cup.

3. A restraining net launching device as claimed in claim 2, wherein said launcher further includes a gas seal member in said launch cup located between said packed net and said rear wall of said launch cup.

4. A restraining net launching device as claimed in claim 1:
   wherein said launcher includes
   a) a gun barrel having a rifled bore and a rear breech, and
   b) a cartridge case in which said packed net is located and which is received in said breech said cartridge case, said cartridge case including a rear wall and an open front; and
   wherein said source of propelling gas is a charge provided in said cartridge case between said packed net and said rear wall.

5. A restraining net launching device as claimed in claim 4, wherein said launcher further includes a gas seal member located between said packed net and said charge.

6. A restraining net launching device as claimed in claim 4, wherein said cartridge case further includes a protective cap which covers the open front thereof.

7. A restraining net launching device as claimed in claim 1:
   wherein said launcher includes
   a) a gun barrel having a smooth bore and a rear breech, and
   b) a cartridge case in which said packed net is located and which is received in said breech, said cartridge case including a rear wall, an open front, and rifling along an interior wall of said cartridge case between said rear wall and said open front; and
   wherein said source of propelling gas is a charge provided in said cartridge case between said packed net and said rear wall.

8. A restraining net launching device as claimed in claim 7, wherein said launcher further includes a gas seal member located between said packed net and said charge.

9. A restraining net launching device as claimed in claim 7, wherein said cartridge case further includes a protective cap which covers the open front thereof.

* * * * *